United States Patent
Gstrein

(12) 
(10) Patent No.: US 6,383,339 B1
(45) Date of Patent: May 7, 2002

(54) TRANSFER BELT

(75) Inventor: Hippolit Gstrein, Gloggnitz (AT)

(73) Assignee: Weavexx Corporation, Wake Forest, NC (US)

( * ) Notice: Subject to any disclaimer, the term of this patent is extended or adjusted under 35 U.S.C. 154(b) by 0 days.

(21) Appl. No.: 09/538,763

(22) Filed: Mar. 30, 2000

(51) Int. Cl.[7] ............................. D21F 3/00; B32B 5/06
(52) U.S. Cl. .................. 162/358.4; 162/306; 442/272
(58) Field of Search ................ 162/358.1, 358.2, 162/358.4, 348, 306, 900, 901, 902, 904; 442/320, 321, 322, 323, 324, 325, 326, 270–275, 277, 281; 139/383 A, 383 AA

(56) References Cited

U.S. PATENT DOCUMENTS

| | | | |
|---|---|---|---|
| 4,565,735 A | * | 1/1986 | Murka, Jr. et al. ........... 442/324 |
| 4,571,359 A | * | 2/1986 | Dutt ........................... 442/324 |
| 4,701,368 A | * | 10/1987 | Kiuchi et al. ................ 428/233 |
| 5,298,124 A | * | 3/1994 | Eklund et al. ............... 162/306 |
| 5,945,358 A | * | 8/1999 | Marchand .................... 442/240 |
| 6,077,795 A | * | 6/2000 | Blinkhorn et al. ........... 442/327 |

FOREIGN PATENT DOCUMENTS

| | | | |
|---|---|---|---|
| DE | 297 06 427 | 6/1997 | ............ D03D/1/00 |
| EP | 0 741 204 A | 11/1996 | ............. D21F/1/00 |

OTHER PUBLICATIONS

Copy of PCT Search Report for PCT/EP 00/03024.

* cited by examiner

*Primary Examiner*—Peter Chin
*Assistant Examiner*—Eric Hug
(74) *Attorney, Agent, or Firm*—Myers Bigel Sibley & Sajovec

(57) ABSTRACT

A transfer belt of a web press with an extended press gap for drying a paper web includes a support belt, in particular a woven or machined belt, a water-resistant polymer layer needled onto the support belt, and a fibrous surface layer arranged on the polymer layer.

25 Claims, 2 Drawing Sheets

TRANSFER BELT

RELATED APPLICATIONS

This application claims priority from German Application No. 199 15 891.6, filed Apr. 8, 1999, the disclosure of which is incorporated herein by reference in its entirety.

FIELD OF THE INVENTION

The invention relates to a transfer belt of a wet press with extended press gap for drying a paper web.

BACKGROUND OF THE INVENTION

In wet presses of paper machines, a substantial portion of fluid contained in a fresh paper web is squeezed out between pressure rollers which form a press gap or, in the case of a so-called shoe press, between a press shoe and a counter roller. The paper web is usually guided by means of a continuous felt belt through the press gap in which the felt belt picks up fluid from the paper web and discharges it.

In a so-called tandem shoe press, dewatering is generally carried out between two press felts. In a new development, one of these press felts is replaced by a transfer belt, thus allowing dewatering output in the press gap (nip) to be improved and the gap between the last web press and the dry section of the paper machine (the so-called "dry section") to be closed. A transfer belt should provide even pressure transfer within the press gap, offer good sheet delivery and not cause a substantial rehumidification of the paper web when running out of the press gap. Transfer belts used in practice are generally formed substantially of polyurethane and typically have a smooth, ground surface.

It has been found that the paper delivery properties of these polyurethane transfer belts may not be entirely satisfactory; furthermore, a paper web guided on them through the press gap typically has surfaces of unequal smoothness ("two-sidedness"); this two-sidedness is ordinarily viewed as a lack in quality in the case of graphic papers.

SUMMARY OF THE INVENTION

It is, therefore, an object of the invention to provide a transfer belt with improved application properties which, in particular, may have advantages in sheet delivery and surface texture of a produced paper web.

This and other objects are satisfied by the present invention, which encompasses the basic idea of replacing a conventional transfer belt having a smooth surface facing toward the paper web with one having a fibrous surface which substantially matches the surface texture of the press felt located on the other side of the paper web. Such a transfer belt can match the surface texture on both surfaces of the paper web and substantially dispose of the disadvantageous two-sidedness.

A transfer belt of the present invention can provide this feltlike, fibrous surface texture by a two or more component coating on a support belt, which is in particular woven or machined. The aforementioned multiple component coating is needled to the support belt and firmly joined thereto by thermo-mechanical techniques, (i.e. by a suitably chosen pressure and temperature application regime), such that the composite can withstand the high mechanical loads a transfer belt is subjected in the web press section of a paper machine. The aforementioned two or more component coating of the support which delivers the fibrous structured surface incorporates a relatively thick water-resistant low melting polymer coating which is firmly joined to the support belt and a thin fibrous surface coating of non-melting (relative to the polymer coating) and non-adhesive fibres which are themselves firmly joined to the polymer coating.

In some embodiments, the transfer belt is insulated on both sides with a polymer layer in order to prevent the "carrying along" of water on the underside of the belt.

Preferably low melting polyolefins, polyamides, polyesters, polyacrylate or polyvinyls are used for the polymer layer.

The low melting polymer layer is formed after the needling process or during the fusing process by melting the fibres of the polymer, typically at temperatures in the range between 100° and 220° C., preferably between 120° and 150° C. Through the application of pressure in the range between 5 kg/cm$^2$ and 70 kg/cm$^2$, the softening temperature of the polymer can be reduced and the compression of the belt increased.

The polymer layer is formed in that meltable or melt-adhesive components within a feltlike structure which is applied to the support belt are molten under pressure. This method of forming a polymer layer can provide a predetermined compressibility which substantially contributes to an even pressure transfer in the press gap and excellent delivery properties during transfer of the paper web into the dry part. The low thickness of the fibrous surface layer, which is arranged on the water-resistant polymer layer, can provide excellent delivery properties at the transfer of the paper web in the dry part and reduced rehumidification which disposes of a grave disadvantage of press felts relative to the present transfer belt.

In a preferred embodiment, the support belt has in particular a multi-layered or laminated structure of fine twists in all layers, both in the longitudinal and transverse direction. The fine fibres may be monofilaments with a wire thickness between 0.1 and 0.3 mm which can be multiply twisted, filament twists or mixed twists out of monofilaments and multifilaments. When the support fabric has a seam, coarser monofilaments with a wire thickness between 0.3 and 0.8 mm may be used.

In another embodiment, a fleece layer is provided on the side of the support belt facing away from the polymer layer which is firmly joined to the support belt and which can further improve the pressure transfer properties in the press gap. When applying a plurality of fabric layers for the support web, then these are preferably jointly needled, which produces in particular the fibre structure for forming the polymer layer simultaneously with joining the fabric layers.

The area of the transfer belt which following the thermomechanical finish forms the polymer layer is structured in particular of fibres with a proportion of melting or melt-adhesive fibres of at least 10%, though preferably in the region of between 25 and 100%. The polymer layer is in a particularly lasting design additionally reinforced by longitudinal and/or transverse threads additionally melted into the (needled) fibre structure.

The thickness of the polymer layer (or in the event two polymer layers are present, both polymer layers together) lies in the range between 20 and 90%, in particular between 60 and 90%, of the total thickness of the transfer belt. In contrast thereto, the mean thickness of the fibrous surface layer lies only in the region between 1 and 10% of the total thickness of the transfer belt. For practical reasons, the fibrous surface layer typically includes high temperature and friction resistant fibres, thus providing the opportunity for long life of both this surface layer and the transfer belt as a whole with constant texturing properties relative to the paper web. The fibrous surface layer is formed preferably out of fibrous material with a melting point that lies 50° to 100° C. higher than the melting point of the polymer layer out of e.g., polyester, polyamide or polycarbonate fibres, and/or with "non-melting" fibres such as PAC, aramid, Teflon or carbon fibres.

Due to high rigidity of a transfer belt, a design as a seamed belt or as a seamed felt fabric which is fully sealed when pulled in is particularly preferred.

Particularly suitable for an embodiment of the support belt are polyamide, polyester, and aramid as well as other fibres of high expansion resistance and great strength and flexibility. Polyamide, polyester, polyolefins such as polypropylene, and polyvinyls such as PVC fibres, as well as selected copolymers thereof, but also other readily available polymer fibres, can be used as needled fibres as well as for structuring the rear fleece. The aforementioned fibres have thermoplastic properties and are thus suitable for forming a dense, water-resistant polymer layer below the surface of the transfer belt which is facing the paper web. Precise setting of desired properties is carried out in a conventional manner by selection of base polymers of suitable structure, in particular chain length and degree of bonding, and, if appropriate, by an addition of softeners and other additives.

When forming the surface layer of thermoplastic fibres, it has to be observed in the production of the transfer belt that the thermo-mechanical treatment may be matched to the physico-chemical properties of the surface fibre material in such a maimer that substantially no fusing (with accompanying loss of texture) of the fibres takes place at the surface.

Advantages and practicalities of the invention are contained in the following description of preferred exemplary embodiments based on the figures.

DETAILED DESCRIPTION OF THE INVENTION

The present invention will now be described more fully hereinafter. This invention may, however, be embodied in many different form sand should not be herein; rather, these embodiments are provided so that this disclosure will be thorough and complete, and will fully convey the scope of the invention to those skilled in the art.

Figure 1:
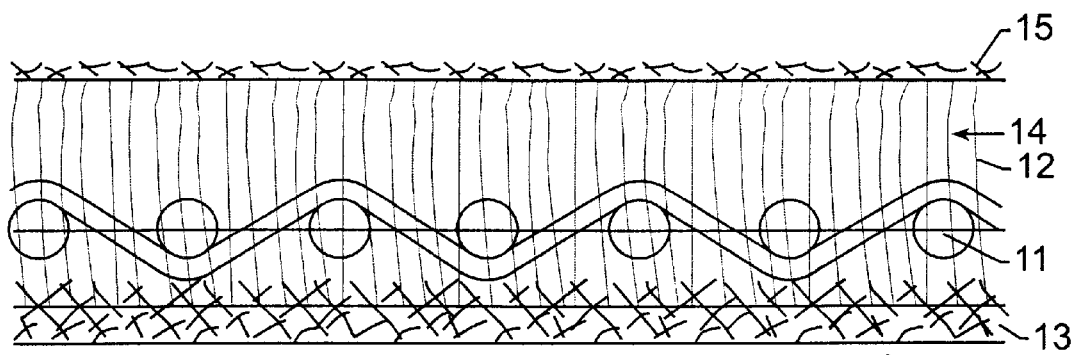
FIG. 1 is a diagrammatical (not true to scale) cross-sectional illustration of a transfer belt according to a first embodiment of the present invention.

Turning now to the drawings, FIG. 1 illustrates the structure of a transfer belt 10 with single-layered support fabric 11 in cross-section. To a surface of support fabric 11 is applied a polymer fibre structure 12, and on the surface facing away from the latter a short-fibre fleece 13. The polymer fibre structure 12 is needled onto fabric 11 and subjected to pressure and heat treatment, so that it is melted into a water resistant and compressible polymer layer 14 (not shown in the figure) whilst forming cavities of different size and shape. As used herein, "water resistant" means that the permeability of the polymer layer should lie in the range of 0 to 50 l/dm$^2$.min, and preferably below 30 l/dm$^2$.min under conventional pressures in the press gap. A thin fibrous or feltlike surface layer (flocking) 15 of high temperature resistant and friction resistant fibres is arranged on the polymer fibre structure 12 or a therefrom-produced polymer layer 14.

Support fabric 11 is made of high tensile strength but relatively fine twists, for example of polyamide or p-aramide, to provide tensile strength and running properties of the transfer belt which are similar to those of conventional polyurethane belts. Thermo-mechanical treatment of the needled fibre structure 12 with a proportion of more than 50% melt-adhesive fibres can provide the development of a polymer water barrier layer of approximately 60% of the belt thickness with predetermined compressibility, which simultaneously fulfills a plurality of important functions. First, it acts in the press gap as pressure distributing medium and can provide advantageous pressure transfer properties from the roller onto the paper web. Second, it can prevent the humidity of the paper web from entering into the depth of the transfer belt to more than a limited extent, so that only a small degree of rehumidification of the paper web takes place. Third, it superposes the fibrous primary texture of flock 15 with a coarser but also feltlike random and pressure resistant secondary texture, thus providing that, together with the surface layer, the paper web which has been dried by with the present transfer belt is practically free of two-sidedness.

Figure 2:
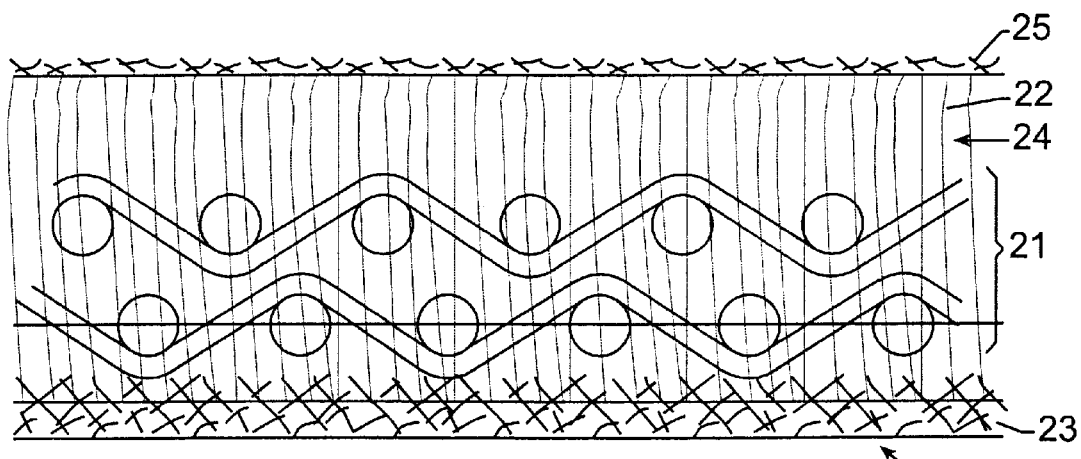
FIG. 2 is a diagrammatical cross-sectional illustration of a second embodiment in the present invention.

A further embodiment of a transfer belt 20 illustrated in FIG. 2 substantially corresponds in its design with the first embodiment shown in FIG. 1. The main difference of this second embodiment from the first embodiment lies in the provision of a two-layered support fabric 21 of which one fabric layer is linked to a fleece 23 whilst a polymer fibre structure 22, which is additionally fixed by pressure fusion to the upper fabric layer of support fabric 21, is needled through both fabric layers of the support fabric 21. Polymer layer 24, which is established by thermo-mechanical treatment below the belt surface, which is here again formed by flocks 25, extends here over a somewhat lesser proportion of the total thickness of the transfer belt, as the support fabric 21, the two layers of which serve to attain increased rigidity and tensile strength, itself claims a larger proportion of the total belt thickness.

In this embodiment, both fabric layers of the support fabric 21 are essentially joined together by the needled polymer fibre structure 22 with a specified elastic displaceability in the movement direction of the belt, which can provide high long term stability of the laminated fabric structure. The other advantages correspond with those referred to above with reference to the embodiment of FIG. 1.

Figure 3:
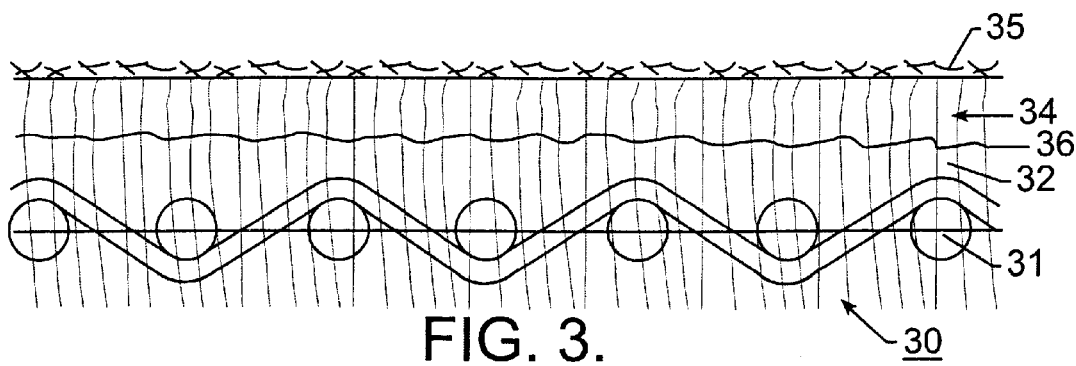
FIG. 3 is a diagrammatical cross-sectional illustration of a third embodiment in the present invention.

FIG. 3 shows an embodiment which is simplified relative to that of FIG. 1. The main difference relative to the embodiment of FIG. 1 lies in omitting the rearsided fleece coating, as a result of which transfer belt 30 with fabric support 31 runs directly on the rollers of the wet press (also see FIG. 4 and the description further down).

Of all here described embodiments, transfer belt 30 is typically the most flexible and structurally simplest and thus, when using identical fibre materials, is typically also the most cost-effective one. Omitting the fleece layer, which in the two other embodiments protects the support fabric from friction, then may require a selection of a sufficiently wear resistant material for the support fabric, for example polyamide. The aforementioned materials are suitable as materials for polymer fibre stricture 32, of which polymer layer 34 is formed, and for surface layer 35. Surface layer 35 is, as in the other designs, in particular itself needled to polymer layer 34, and its thermo-mechanical treatment takes care of highly wear resistant fixing of the surface layer. Also, an arrangement of longitudinal threads 36 is included in polymer layer 34 in order to increase the tensile strength and for improvement of distribution of tensile loads over the height of the belt.

Figure 4:
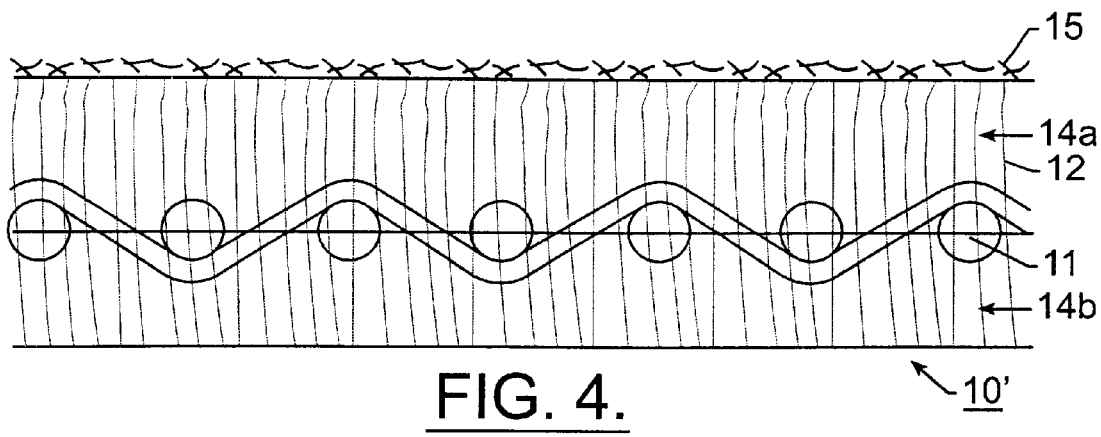
FIG. 4 is a diagrammatical cross-sectional illustration of a fourth embodiment of the present invention.

FIG. 4 shows a modified transfer belt 10' with respect to FIG. 1 in which a polymer fibrous structure 12 is formed extending on both sides of the support fabric 11 and from which a first polymer layer 14a lying above the support fabric 11 and a second polymer layer 14b lying underneath the support fabric are formed. This embodiment is advantageous in that the transfer belt here is insulated on both sides with a polymer layer and the entrainment of water on the underside of the transfer belt may be prevented.

Figure 5:
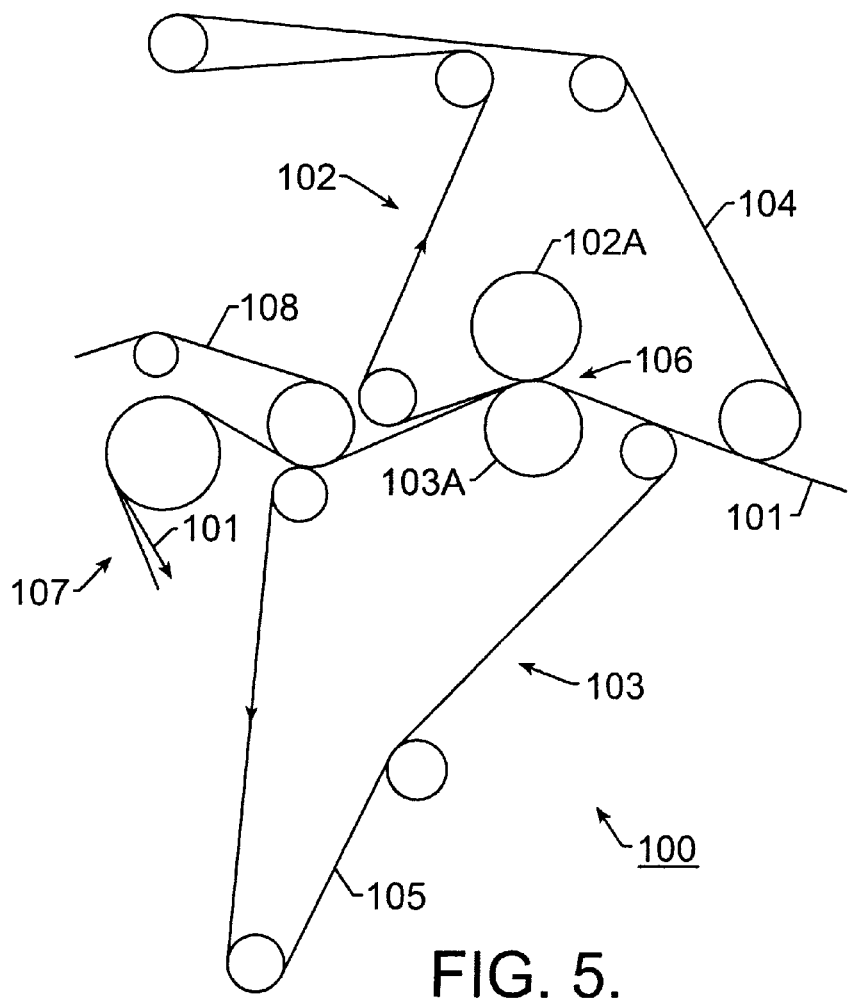
FIG. 5 is a diagrammatic illustration of a web press into which a inventive transfer belt of the present invention can be inserted.

FIG. 5 is a basic diagram of a web press 100 as part of a paper machine (not illustrated in its entirety) which includes the inventive transfer belt. A paper web 101 runs between a first roller arrangement 102 (at the top of the illustration) and a second roller arrangement 103 (at the bottom of the illustration), of which the first roller arrangement 102 transports a press felt 104 and the second roller arrangement 103 transports a transfer belt 105, for example of one of the aforedescribed designs. Between press rollers 102A of the first group of rollers and 103A of the second group of rollers is set a press gap 106 wherein paper web 101 is substantially dewatered between press felt 104 and transfer belt 105. Paper web 101 then runs into a dry section 107 (of which only a portion is shown in the figures), where it is guided by drying belt 108. After dewatering, press felt 104 and transfer belt 105 return to the input of web press 100.

The inventive design is not restricted to the aforedescribed exemplary embodiments but is also possible in a plurality of modifications. In particular, the multi-component structure of the transfer belt is variable in many ways in dependence of concrete conditions of application, for example of a paper quality to be produced and operational parameters of the web press. Materials applied are not restricted to aforementioned plastic materials, but they can be replaced by other fibre materials of properties known to those skilled in this art.

The foregoing embodiments are illustrative of the present invention, and are not to be construed as limiting thereof. The invention is defined by the following claims, with equivalents of the claims to be included therein.

What is claimed is:

1. A transfer belt for a papermaker's machine, comprising:
   a support belt;
   a first water-resistant polymer layer overlying said support belt, said polymer layer comprising polymer fibers needled into said support belt and subsequently melted together; and
   a surface layer with a feltlike texture overlying said polymer layer.

2. The transfer belt defined in claim 1, wherein said surface layer has a fibrous texture.

3. The transfer belt defined in claim 1, wherein said support belt comprises at least one woven fabric.

4. The transfer belt defined in claim 1, wherein said support belt comprises multiple layers.

5. The transfer belt defined in claim 4, wherein said multiple layers of said support belt comprise woven fabric layers.

6. The transfer belt defined in claim 1, further comprising a fleece layer overlying a surface of said support belt opposite said first polymer layer.

7. The transfer belt defined in claim 1, farther comprising a second polymer layer overlying said support belt on a side opposite said first polymer layer, said second polymer layer comprising polymer fibers needled into said support belt and subsequently melted together.

8. The transfer belt defined in claim 3, wherein said support belt includes a seamed fabric.

9. The transfer belt defined in claim 1, wherein said polymer fibres comprise at least 10% by weight thermoplastically deformable or melt-adhesive fibres.

10. The transfer belt defined in claim 1, wherein said polymer fibers comprise a mixture of hydrophilic and hydrophobic components.

11. The transfer belt defined in claim 1, wherein said first polymer layer has a thickness of between about 20 and 90 percent of the total thickness of the transfer belt.

12. The transfer belt defined in claim 1, wherein said first polymer layer further comprises at least one of fused longitudinal and transverse threads.

13. The transfer belt defined in claim 1, wherein said surface layer has a thickness of between about 1 and 10 percent of the total thickness of the transfer belt.

14. The transfer belt defined in claim 1, wherein said surface layer comprises fibers having a melting point at least 50° C. higher than the melting point of the fibres forming the polymer layer.

15. The transfer belt defined in claim 1, wherein said surface layer is formed of a material selected from the group consisting of: polyester; polyamide, polycarbonate; PAC, aramid, polytetraflouorether; and carbon fibers.

16. The transfer belt defined in claim 1, wherein said polymer fibers of said first polymer layer are formed of a material selected from the group consisting of: polyolefins; polyamides; polyesters; and polyvinyls.

17. The transfer belt defined in claim 1, wherein said first polymer layer is formed at a temperature between about 100° and 220° C., and at a pressure between about 5 kg/cm² and 70 kg/cm².

18. The transfer belt defined in claim 1, wherein said support belt includes monofilaments with a wire thickness between about 0.1 and 0.3 mm.

19. The transfer belt defined in claim 1, wherein said support belt comprises monofilaments with a wire thickness in the range between 0.3 and 0.8 mm.

20. A method of forming a transfer belt for use in a papermaking machine, comprising the steps of:
   providing a support belt;
   needling polymer fibers to said support belt;
   melting said polymer fibers to form a first water-resistant polymer layer that overlies said support belt; and
   attaching a surface layer with a feltlike texture to said polymer layer to overlie said polymer layer.

21. The method defined in claim 20, further comprising the step of attaching a fleece layer to said support belt.

22. The method defined in claim 20, further comprising the steps of:
   needling polymer fibers to said support belt on a side opposite said first polymer layer, and
   melting said polymer fibers needling to form a second water-resistant polymer layer underlying said support belt.

23. The method defined in claim 20, wherein said melting step comprises applying heat and pressure to said polymer fibers sufficient to melt said polymer fibers.

24. The method defined in claim 23, wherein said melting step comprises applying heat to said polymer fibers at a temperature of between about 100° C. and 220° C.

25. A transfer belt for a papermaker's machine, comprising:
   a support belt;
   a first water-resistant polymer layer overlying said support belt, said polymer layer comprising polymer fibers needled into said support belt and subsequently melted together; and
   a surface layer with a feltlike texture overlying said polymer layer;
   wherein the first polymer layer has a thickness of between about 20 and 90 percent of the total thickness of the transfer belt, and the surface layer has a thickness of between about 1 and 10 percent of the total thickness of the transfer belt.

* * * * *

UNITED STATES PATENT AND TRADEMARK OFFICE
CERTIFICATE OF CORRECTION

PATENT NO. : 6,383,339 B1
DATED : May 7, 2002
INVENTOR(S) : Gstrein-

It is certified that error appears in the above-identified patent and that said Letters Patent is hereby corrected as shown below:

<u>Column 5,</u>
Line 56, should read:
-- 7. The transfer belt defined in claim 1, further comprising --

Signed and Sealed this

Twenty-eighth Day of January, 2003

JAMES E. ROGAN
*Director of the United States Patent and Trademark Office*